(12) United States Patent
Lindsay et al.

(10) Patent No.: US 9,665,400 B2
(45) Date of Patent: *May 30, 2017

(54) METHOD AND SYSTEM FOR DISTRIBUTED TASK DISPATCH IN A MULTI-APPLICATION ENVIRONMENT BASED ON CONSENSUS

(71) Applicant: International Business Machines Corporation

(72) Inventors: Bruce Gilbert Lindsay, San Jose, CA (US); Roger C. Raphael, San Jose, CA (US); Paul Sherwood Taylor, Redwood City, CA (US)

(73) Assignee: International Business Machines Corporation, Armon, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 14/016,827

(22) Filed: Sep. 3, 2013

(65) Prior Publication Data

US 2014/0012808 A1 Jan. 9, 2014

Related U.S. Application Data

(63) Continuation of application No. 12/688,337, filed on Jan. 15, 2010, now Pat. No. 8,910,176.

(51) Int. Cl.
*G06F 17/30* (2006.01)
*G06F 9/50* (2006.01)
*G06F 9/54* (2006.01)

(52) U.S. Cl.
CPC .......... *G06F 9/5011* (2013.01); *G06F 9/5061* (2013.01); *G06F 9/54* (2013.01);
(Continued)

(58) Field of Classification Search
None
See application file for complete search history.

(56) References Cited

U.S. PATENT DOCUMENTS 6,463,532 B1 * 10/2002 Reuter ...................... G06F 9/52
707/E17.007
6,816,905 B1 * 11/2004 Sheets .................. G06F 9/5061
709/226

(Continued)

OTHER PUBLICATIONS

Kritzinger et. Al., A Queuing Model of a Time-Sliced Priority-Driven Task Dispatching Algorithm, Mar. 1980, IEEE Transactions on Software Engineering, vol. 6, Issue 2, pp. 219-225.*

(Continued)

*Primary Examiner* — Abu Ghaffari
(74) *Attorney, Agent, or Firm* — Sughrue Mion, PLLC

(57) ABSTRACT

A method and system for distributing tasks from an external application among concurrent database application server instances in a database system for optimum load balancing, based on consensus among the instances. Each application instance identifies a task partition ownership by those in a membership group based on a time window and generates a new membership group and partition ownership based on the current partition ownership. The instance makes the new membership group and partition ownership known to other members by recoding them in the membership table and partition map. Each participation by an instance in the membership group is identified by a random number. The new membership group and partition ownership are generated and adjusted based on an average partition allocation to achieve consensus among the instances.

15 Claims, 12 Drawing Sheets

(52) U.S. Cl.
CPC ........ *G06F 17/30345* (2013.01); *G06F 9/505* (2013.01); *G06F 9/5066* (2013.01); *G06F 9/5088* (2013.01)

(56) References Cited

U.S. PATENT DOCUMENTS

| | | | |
|---|---|---|---|
| 6,950,848 B1 | 9/2005 | Yousefi'zadeh | |
| 7,051,188 B1* | 5/2006 | Kubala | G06F 9/5077 712/29 |
| 7,062,556 B1* | 6/2006 | Chen | G06F 9/505 709/201 |
| 7,146,353 B2 | 12/2006 | Garg et al. | |
| 7,230,925 B2* | 6/2007 | Li | H04L 47/10 370/237 |
| 7,254,626 B1* | 8/2007 | Kommula | H04L 67/1008 709/217 |
| 7,290,059 B2 | 10/2007 | Yadav | |
| 7,370,328 B2* | 5/2008 | Yamada | G06F 9/4881 709/224 |
| 7,519,964 B1* | 4/2009 | Islam | G06F 8/44 717/177 |
| 7,533,128 B1* | 5/2009 | Sanchez | G06F 17/30286 |
| 7,543,046 B1* | 6/2009 | Bae | G06F 15/16 709/224 |
| 7,543,069 B2 | 6/2009 | Hasti et al. | |
| 7,665,092 B1* | 2/2010 | Vengerov | G06F 9/5088 718/105 |
| 7,908,314 B2* | 3/2011 | Yamaguchi | H04L 67/1008 709/203 |
| 7,953,843 B2* | 5/2011 | Cherkasova | H04L 29/06027 709/224 |
| 8,327,371 B2* | 12/2012 | Horii | G06F 9/505 709/226 |
| 9,141,435 B2* | 9/2015 | Wein | G06F 9/5061 |
| 2002/0087612 A1 | 7/2002 | Harper et al. | |
| 2004/0216118 A1* | 10/2004 | Beaumont | G06F 9/5088 718/105 |
| 2004/0254984 A1 | 12/2004 | Dinker | |
| 2005/0114480 A1* | 5/2005 | Ramamoorthy | H04L 67/1002 709/220 |
| 2005/0228879 A1* | 10/2005 | Cherkasova | G06F 9/505 709/224 |
| 2006/0149701 A1* | 7/2006 | Putzolu | G06F 17/30575 |
| 2006/0236324 A1 | 10/2006 | Gissel et al. | |
| 2008/0028413 A1* | 1/2008 | Conklin | G06F 9/461 718/105 |
| 2008/0046890 A1 | 2/2008 | Dunlap et al. | |
| 2008/0071878 A1* | 3/2008 | Reuter | H04L 67/1031 709/208 |
| 2008/0109814 A1* | 5/2008 | Park | G06F 9/3851 718/105 |
| 2008/0195718 A1 | 8/2008 | Hu et al. | |
| 2008/0256557 A1 | 10/2008 | Goft et al. | |
| 2008/0271039 A1 | 10/2008 | Rolia et al. | |
| 2009/0064165 A1* | 3/2009 | Arimilli | G06F 9/522 718/105 |
| 2009/0070489 A1* | 3/2009 | Lu | H04L 29/06 709/245 |
| 2009/0077011 A1 | 3/2009 | Natarajan et al. | |
| 2009/0234858 A1 | 9/2009 | Taylor et al. | |
| 2010/0095004 A1* | 4/2010 | Zuckerman | H04L 67/1008 709/226 |
| 2010/0319005 A1* | 12/2010 | Erignac | G06F 9/52 719/315 |
| 2011/0078696 A1* | 3/2011 | Blackburn | G06F 9/4881 718/104 |

OTHER PUBLICATIONS

Peters et al., "Asynchronous Task Dispatch for High Throughput Computing for the eServer IBM Gene® Supercomputer," IEEE International Symposium on Parallel and Distributed Processing, IPDPS 2008, pp. 1-7, Miami, Florida, USA, Apr. 2008.

Falsafi et al., "Parallel Dispatch Queue: A Queue-Based Programming Abstraction to Parallelize Fine-Grain Communication Protocols," Proceedings of the Fifth International Symposium on High-Performance Computer Architecture, pp. 182-192, Orlando, Florida, USA, Jan. 1999.

An Efficient Global Request Dispatching Scheme for Multimedia Streaming Services, Proceedings of the 10th International Conference on Advanced Communication Technology, ICACT 2008, vol. 2, pp. 1278-1282, Feb. 2008.

* cited by examiner

METHOD AND SYSTEM FOR DISTRIBUTED TASK DISPATCH IN A MULTI-APPLICATION ENVIRONMENT BASED ON CONSENSUS

CROSS-REFERENCE TO RELATED APPLICATIONS

The present application is a continuation of application Ser. No. 12/688,337 filed Jan. 15, 2010, the disclosure of which is hereby incorporated by reference.

FIELD OF THE INVENTION

The invention relates generally to distributed computing for databases, and more particularly, to a method and system for distributed task dispatch in a multi-application database environment based on consensus among the applications.

BACKGROUND

In today's database systems that have multiple server applications executing tasks over multiple threads, there is a need for the server applications to converge to some external service in parallel to meet the service's workload requirements. The external service might have certain load characteristics and constraints. In such a system, it may be necessary for the server applications to deliver to the external service with full scale-up and scale-out functionality. However, in the current state of the art, there is no simple means of having control over failures and re-balancing of the workload due to failures in one or more of the server applications, particularly in the case where the applications rely primarily on database primitives for communication with the database.

Large database architectures generally use two-tier or three-tier systems with a single underlying database in the last tier. This database by virtue of being a single point of failure might be made highly available by data replication or other methods of redundancy such as having redundant network connections. The application servers running in the second tier are typically scaled up and out in most transaction systems. Such systems may have a requirement to deliver transactions to some external application like data indexing, master data transmission or authentication. Although data replication and redundancy mechanism somewhat address the vulnerability of the database in mission-critical data systems, they do not provide a way for dynamically re-balancing the workload of the external application among the server applications.

From the foregoing, it is appreciated that there still exists a need for a method and system for distributed task dispatch among the server applications in a multi-application database environment without the aforementioned drawbacks.

SUMMARY

The invention is directed to a method and system for distributing tasks from an external application among concurrent database application server instances in a database system for optimum load balancing. More particularly, the application server instances each continuously determines an optimum load partition allocation for the application instances to arrive at a consensus among the instances operating in the database system.

The database system includes a database management system (DBMS) that maintains a Membership Table of the application server instances currently participating in a membership group, and a Partition Map in which each partition corresponds to a set of tasks to be performed by the participating application instances. The application server instances communicate with the DBMS preferably using database query primitives to reach a consensus among those in the membership group. Each application server instance identifies the task partition ownership by the current instances in the group based on a time window and generates a new membership group and a new partition ownership using the current partition ownership. The application instance makes the new membership group and partition ownership known to all other members by recoding them in the Membership Table and the Partition Map.

Each participation by an application instance in the membership group is identified by a random number in the Membership Table and the Partition Map. The partition ownership determined by each application instance includes data on the partitions owned by this instance, the partitions allocated to the other application instances in the group, and the partitions that are presently unallocated. The instance generates the new membership group and partition ownership by: (i) determining an average ownership based on the current partition ownership and the number of instances in the group; (ii) releasing a partition that it owns to the membership group if it currently has more partitions than the average; and (iii) taking a partition from those currently unallocated if it currently has less partitions than the average.

The member instance releases a partition by selecting a random partition from those that it currently owns, reporting the partition being released to the hosting application, and waiting for an acknowledgment from the host application. The member instance also marks the selected partition in its local copy of the Partition Map as being released to the membership group. The member instance attempts to take a partition from those currently unallocated by selecting a random partition from the group of unallocated partitions and marking the selected partition in the local copy of the Partition Map as being taken.

In the exemplary embodiments of the invention, the time window used for determining the membership group and partition ownership begins at the present time minus a multiple of a lease interval and ends at the present time plus the lease interval. The lease interval is a predetermined period of time during which a participation by an application instance in the membership group remains valid. Each participation by an application instance in the group is associated with a lease time-stamp which indicates when the participation expires. The new membership group includes those instances that have the lease time-stamps within the established time window. Once the new membership group is determined, the subject application instance resets the lease time-stamps of the instances that it has identified in the new membership group to the present time. Each application instance is also associated with a birth time-stamp which is used in the embodiments of the invention for pruning stale members from a membership group, i.e., those member instances that have the birth time-stamps older than a predetermined time.

In another embodiment of the invention, a database system capable of distributed task dispatch based on consensus is described. The system includes a DBMS, multiple application instances communicating with the external application and DBMS, and a Membership Table and a Partition Map maintained in the DBMS. Each member in the Membership Table corresponds to an application instance that currently appears in the membership group. The Partition Map has partitions where each corresponds to a set of tasks to be processed by the application instances. Each application instance identifies a current partition ownership based on a time window, generates a new membership group and a new partition ownership using the current partition ownership, and records the new group and partition ownership in the Membership Table and Partition Map.

In yet another aspect of the invention, a computer program product is described for use in a database system to distribute tasks from an external application among multiple application instances based on consensus. The instances communicate with a DBMS that has a table of the instances participating in a membership group and a map of partitions corresponding to sets of processing tasks. The product includes a computer usable storage medium having readable program code embodied in the storage medium. The program code is operable to identify a current partition ownership by the instances in the membership group based on a time window, generate a new membership group and partition ownership based on the current partition ownership, and record the new group and partition ownership in the Membership Table and the Partition Map.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

Figure 1:
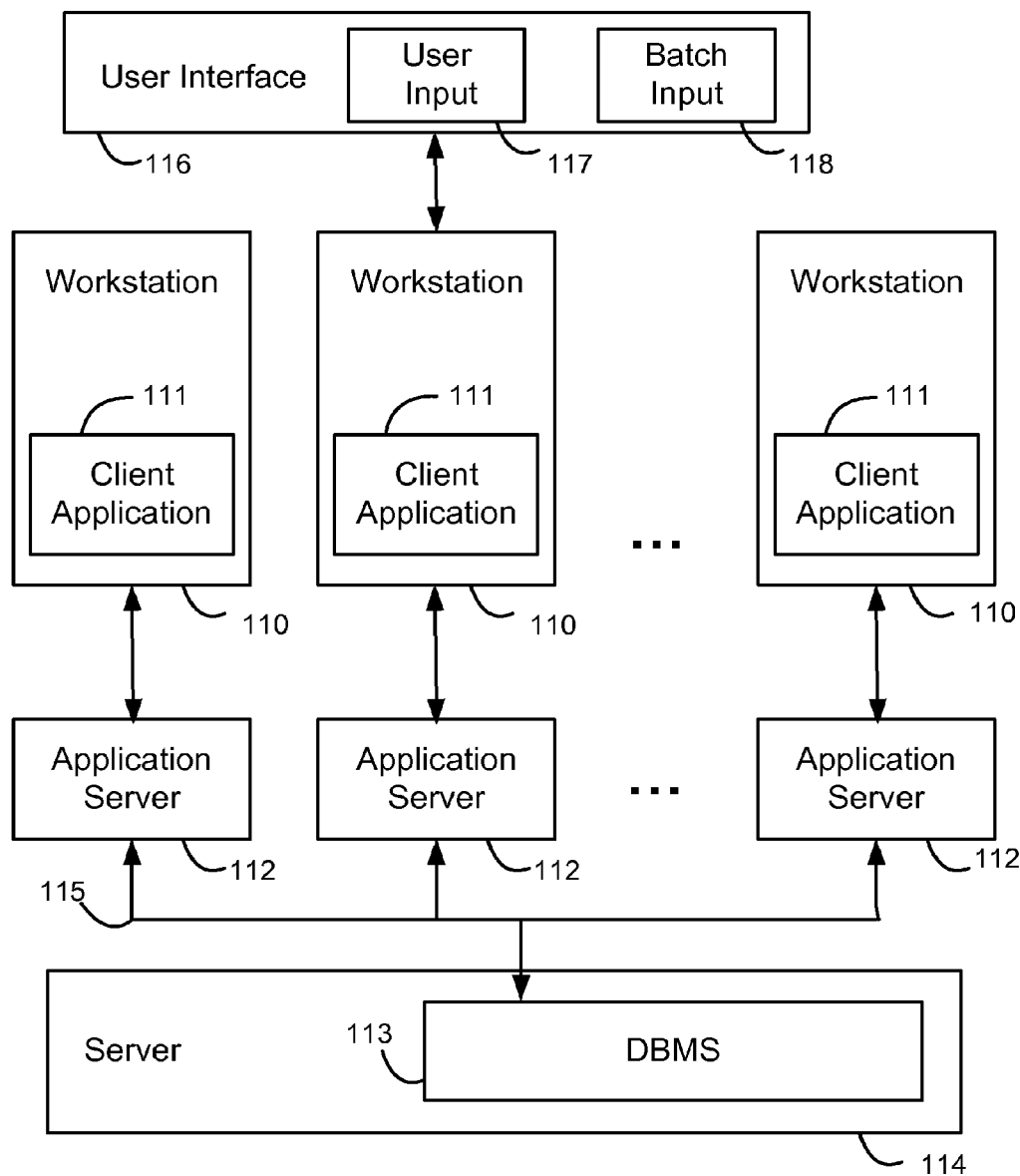
FIG. 1 is a block diagram illustrating a typical multi-tier database system including multiple database client applications, application servers and a database management system.

The invention relates generally to a method and system for distributing tasks from an external application among concurrent database application server instances for optimum load balancing. More particularly, the application server instances each continuously determines an optimum load partition allocation for the application instances to arrive at a consensus among the instances in a membership group. Although the consensus achieved by the membership group will be described in the context of load-balancing in a database application, it could be similarly applied to other dynamic membership problems in computing systems.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention treats the transactions to the external application as tasks in a persisted queue. The queue is logically partitioned by assigning a partition identifier to each task entry in the queue. The number of partitions is established in advance. The invention allows each database server application running in its own address space (distributed as needed) to freely generate these tasks and dynamically assigning to itself a partition with full consensus among all instances of the database application. The partitioned sets of tasks run with full parallelism to deliver transactions to the external application. The invention takes into consideration asymmetric configurations and capabilities of the nodes in which the server applications are running as well as failures by appropriately re-balancing the workload with full consensus. The method and system of the invention might be practiced using SQL-based primitives to the already highly available central database deployed in the second-tier or third-tier applications.

The invention might be used to provide a way for dispatching tasks to the external server or service with transparency to failures, imbalance of resources and anomalies of the service response times due to intermittent or asymmetric node capabilities. The dispatch method might be synchronous or asynchronous. The invention might also be applicable to multi-threaded and multi-address space database applications where there is a highly available central database that forms the backbone of the overall system.

Referring now to FIG. 1 which shows a block diagram of a typical multi-tier database system in which aspects of the invention might be applicable. The database system includes multiple workstations 110 each running a client application 111. A user interface 116 allows a user to interact with a workstation 110 to access data in the database system. The input to a workstation 110 may be from a user input component 117, e.g., a keyboard, or a batch program input 118. The client applications 111 access a database management system (DBMS) 113 through application servers 112. The application servers 112 generally are programs that manage data at the content level. A DBMS is a set of programs that controls the creation, maintenance, and the use of a database in a computer such as a server 114. The DBMS 113 allows different types of application server programs 112 to access the same database, typically using a database query language such as the Structured Query Language (SQL). SQL is a structured programming language that allows different types of server applications to access a common relational databases using the same data access format. The application servers 112 typically communicate with the DBMS 113 via a computer network 115.

Figure 2:
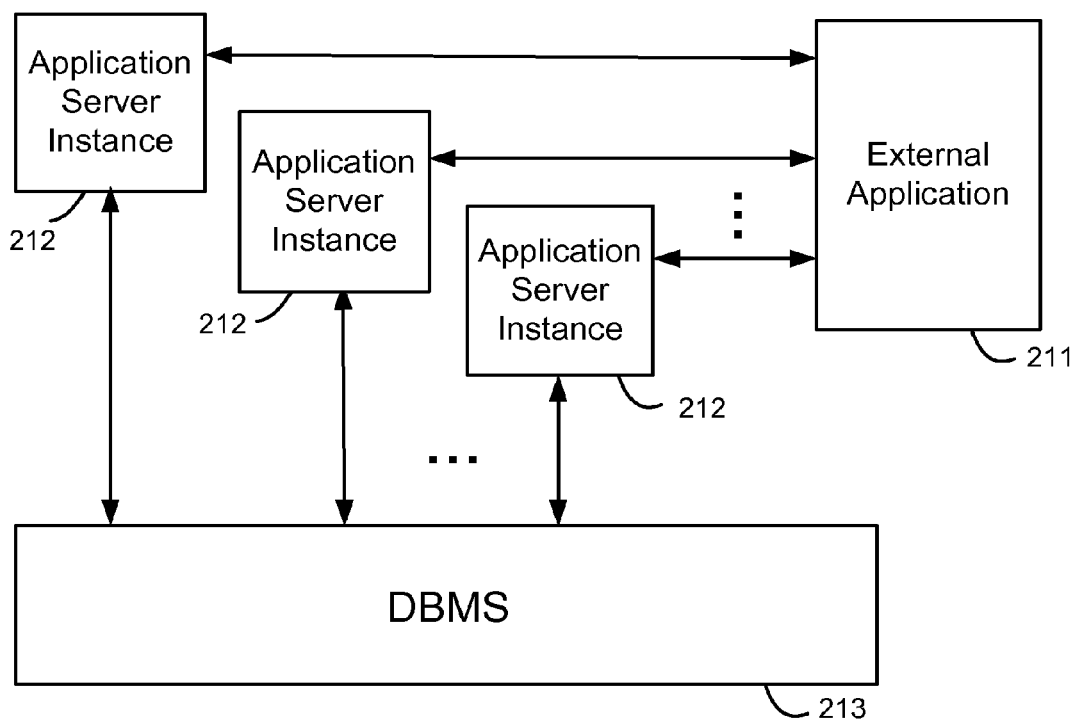
FIG. 2 is a block diagram illustrating a database application environment with multiple application server instances running concurrently in one or more computer nodes to process database queries from an external application.

FIG. 2 is a block diagram illustrating a database application environment in which the preferred embodiments of the invention might be included to provide distributed task dispatch based on consensus among database application instances. The database environment has multiple application server instances 212 running concurrently to process database queries from an external application 211. As an example, the external application 211 may be a payroll processing application. The application server instances 212 may be general content management programs such as the FileNet Content Manager products offered by International Business Machines Corporation of Armonk, N.Y. They access a database management system 213 such as a DB2® database product, also provided by International Business Machines Corporation. DB2® is a trademark of International Business Machines Corporation, registered in many jurisdictions worldwide.

Figure 3:
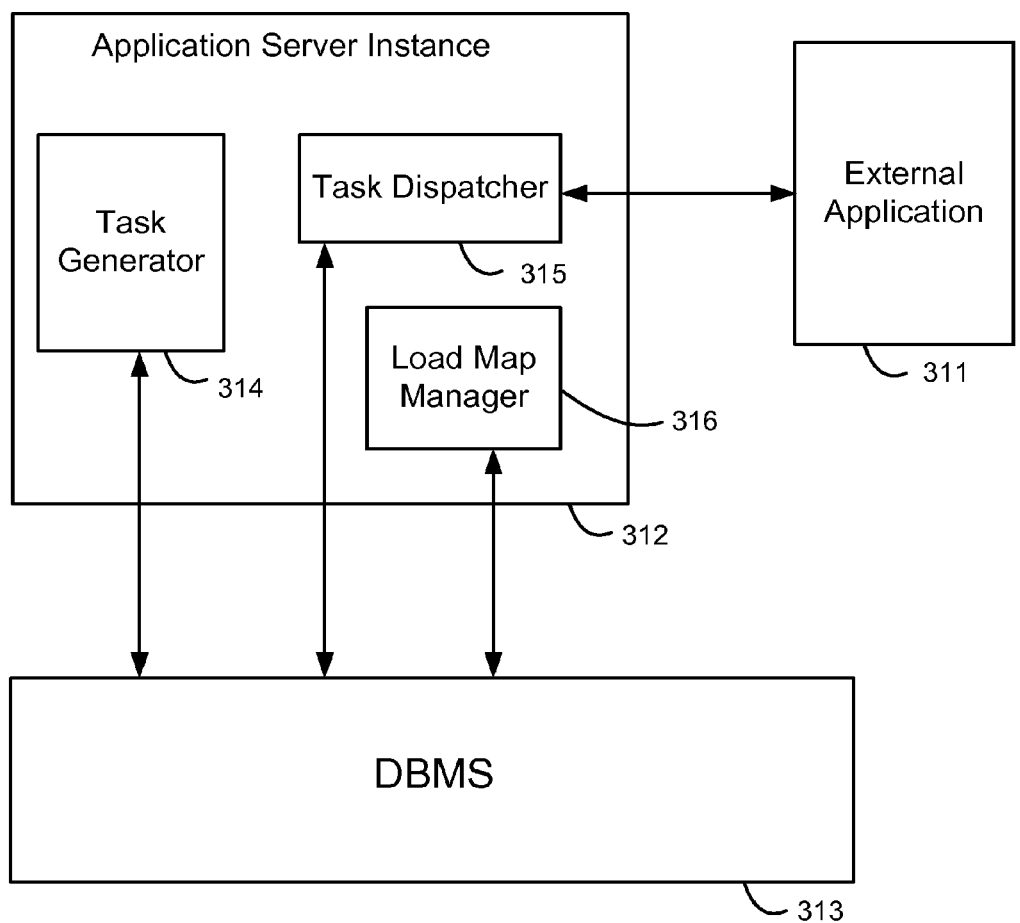
FIG. 3 is a block diagram showing an exemplary embodiment of a database application server instance for supporting distributed task dispatch in accordance with the invention.

FIG. 3 is a block diagram showing an exemplary embodiment of a database application server instance to support distributed task dispatch in accordance with the invention. The application server instance 312 has a Load Map Manager 316 for determining the processing workload currently allocated to this application server instance and other instances in processing queries from an external application 311. The Load Map Manager 316 manages and adjusts the workload allocation as needed to maximize overall system performance. The application server instance 312 further includes a Task Generator 314 and a Task Dispatcher 315. The Task Generator 314 is responsible for creating the tasks to be performed by the application instance 312. The Task Dispatcher 315 receives tasks from the external application 311 and interacts with the DBMS 313 in processing the tasks. A common objective of the Load Map Managers 316 in the application server instances 312 is to distribute the database workload among the instances 312 such that the processing power and resources of each application instance 312 are fully utilized.

Figure 4:
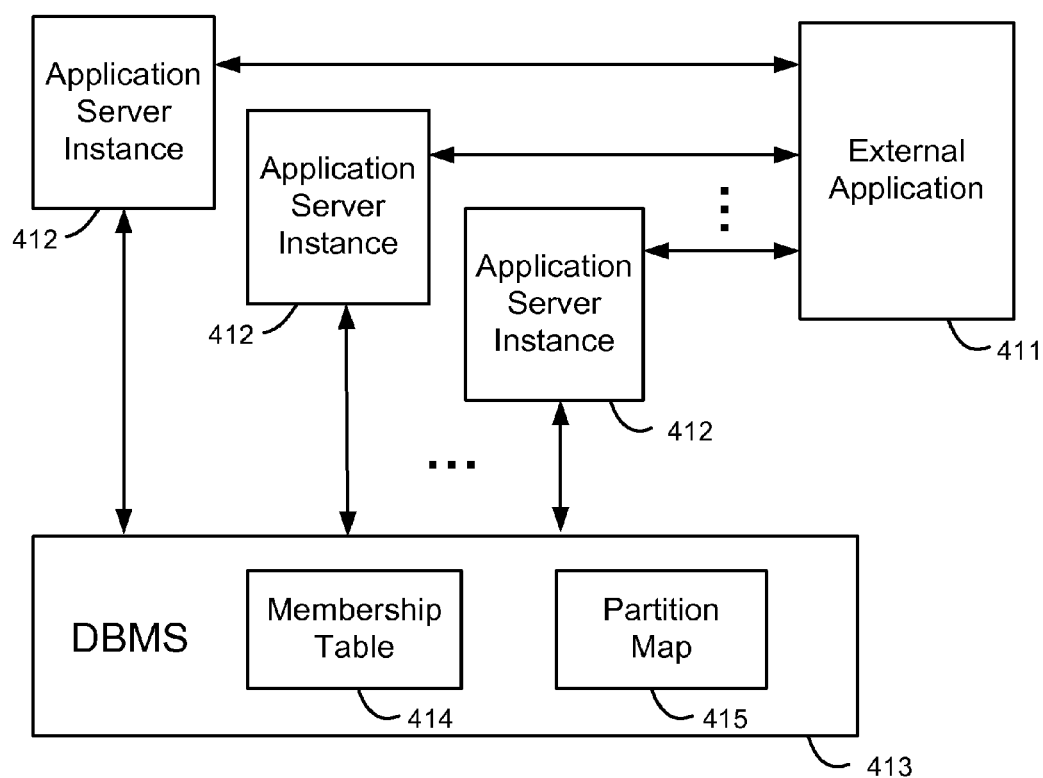
FIG. 4 is a block diagram illustrating a database system having multiple application server instances capable of distributed task dispatch based on consensus among the application server instances, in accordance with the invention.

FIG. 4 is a block diagram illustrating a database system with multiple application server instances capable of distributed task dispatch based on consensus among the instances, according to the invention. The system includes application server instances 412 running concurrently to process database statements from an external application 411. The application server instances 412 access a relational DBMS 413 preferably using the Structured Query Language (SQL). The DBMS 413 maintains a Membership Table 414 that includes information about the application instances that are currently in a membership group for dispatching tasks from the external application 411. The DBMS 413 further includes a Partition Map 415 for keeping track of the ownership of the task partitions that are currently allocated to the application server instances 412 in the membership group. The partition allocation and ownership are generated based on a consensus reached by the application instances currently in the membership group to achieve optimal system performance. Further details on the Membership Table 414 and Partition Map 415 will be described below in reference to FIGS. 5 and 6. The process for determining the current partition distribution and generating a partition load map based on consensus among the application instances will be described below in reference to FIGS. 7-14.

Figure 5:
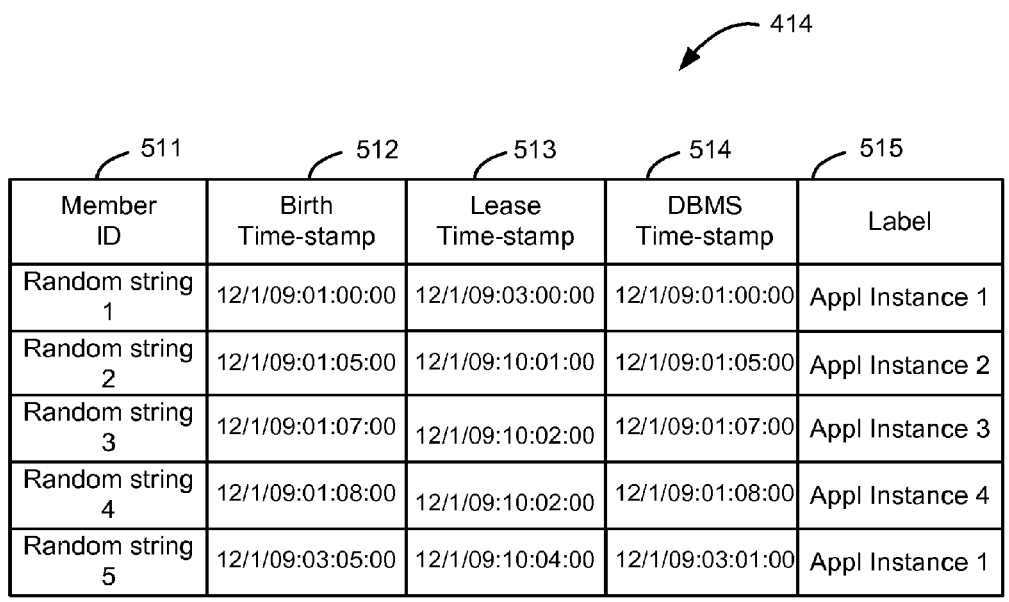
FIG. 5 is a block diagram showing an example of a Membership Table in a database system capable of distributed task dispatch based on consensus among the application server instances, in accordance with the invention.

FIG. 5 illustrates an exemplary Membership Table 414 in the embodiments of the invention for providing distributed task dispatch based on consensus among the application server instances. As an example, the Membership Table 414 includes a header row and five rows each displaying an appearance of an application server instance in the membership group. The Membership Table 414 has a Member ID column 511 which contains a random string associated with each appearance of an application instance in the membership group. A Birth Time-stamp column 512 indicates when an application instance begins its participation in the group. A Lease Time-stamp column 513 indicates when a participation of an application instance in the membership group will expire; i.e., when this participation of the application instance is no longer valid for the purpose of determining the consensus-based distribution of the partitions. A DBMS Time-stamp column 514 indicates the time stamps from the DBMS that correspond to the Birth Time-stamps 512 associated with the application instance appearances, for the purpose of time synchronization and clock drift computation among the application instances. The time-stamps are 64-bit integers in the exemplary embodiments of the invention. A Label column 515 indicates a description of the application instance involved in a particular appearance of the instance in the membership group.

As an example, the row immediately below the header row in the Membership Table 414 indicates a participation in the membership group by Application Instance 1, which begins at a Birth Time-stamp 512 of "12/1/09:01:00:00" and has a Lease Time-stamp 513 of "12/1/09:03:00:00". This participation is associated with "Random string 1" and has a Label of "Appl Instance 1" to indicate that the participation is by the Application Instance 1 of the system. The DBMS Time-stamp 514 of this participation is the same as its Birth Time-stamp 512, which is "12/1/09:01:00:00".

In the example shown in FIG. 5, the membership participation associated with the "Random string 1" has ended either during its lease period or when its lease expired at the Lease Time-stamp 513 of "12/1/09:03:00:00". The Application Instance 1 then rejoined the membership group a second time as shown in the bottom row of the Membership Table 414. The second participation by the Application Instance 1 in the membership group is associated with "Random string 5" and has a Birth Time-stamp 512, a Lease Time-stamp 513 and a DBMS Time-stamp 514 of "12/1/09:03:05:00", "12/1/09:10:04:00", and "12/1/09:03:01:00", respectively. The Label 515 for the second membership participation by the Application Instance 1 is also "Appl Instance 1" as it was in its first participation in the group.

Figure 6:
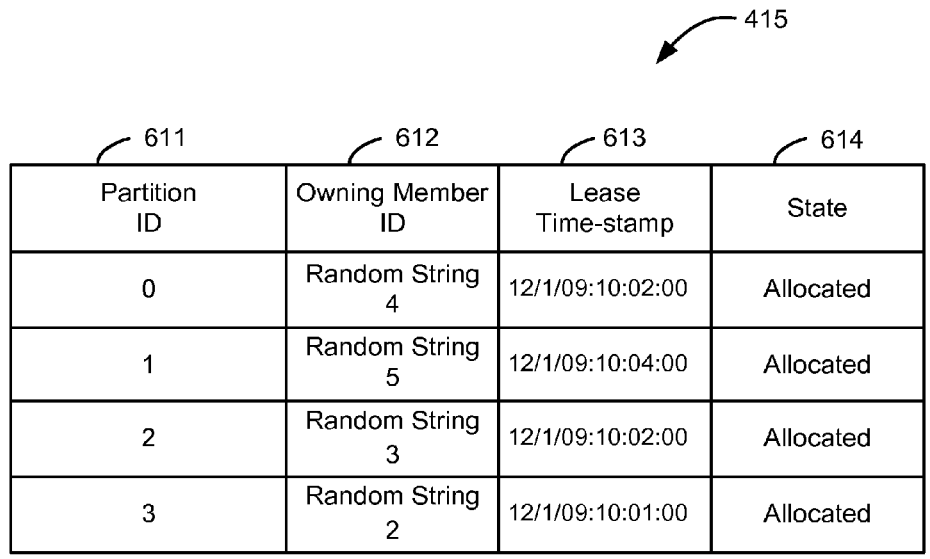
FIG. 6 is a block diagram showing an example of a Partition Map in a database system capable of distributed task dispatch based on consensus among the application server instances, in accordance with the invention.

FIG. 6 shows an example of a Partition Map 415 in the embodiments of the invention. The exemplary Partition Map 415 has a header row and four rows each representing a partition. Each partition is associated with a Partition ID in column 611, an Owning Member ID in column 612, a Lease Time-stamp in column 613 and a State in column 614. The Partition ID 611 has a value from 0 to 3, which is the upper limit of the Partition Map 415 in this example. The Owning Member ID 612 is the same as the random string 511 in FIG. 5, which is associated with an appearance of an application instance in the membership group. The Lease Time-stamp 613 indicates when a particular appearance of an application instance in the group will expire. The State Field 614 represents the current state of a particular partition in the Partition Map 415, which might be either "allocated" or "unallocated".

Figure 7:
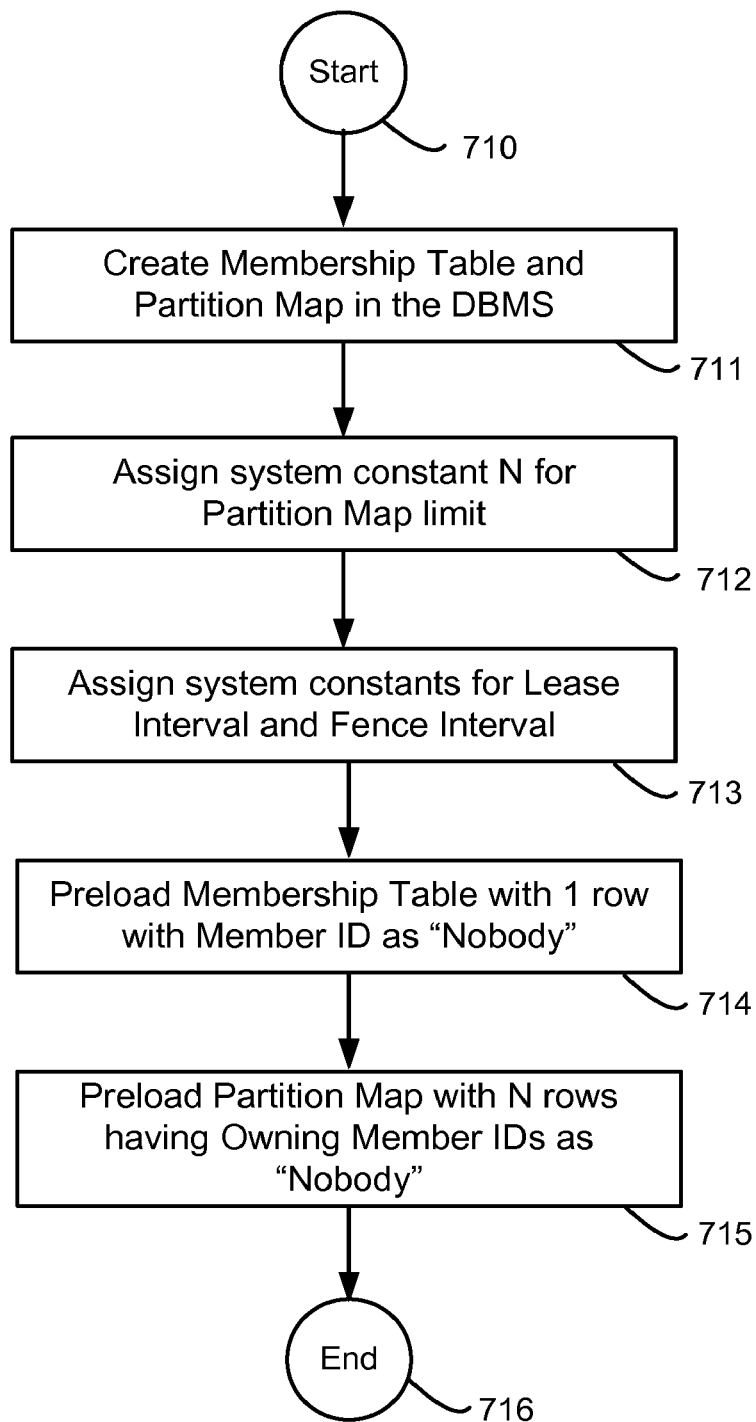
FIG. 7 is a flow chart representing an exemplary process for a one-time system initialization to provide distributed task-dispatch based on consensus among the application server instances, in accordance with the invention.

FIG. 7 is a flow chart representing an exemplary process for a one-time initialization of a host system program to provide distributed task dispatch based on consensus in the embodiments of the invention. The process starts at block 710. At block 711, the host system program creates a Membership Table 414 and a Partition Map 415 in the DBMS. An example of the fields in the Membership Table 414 and Partition Map 415 was described above in reference to FIGS. 5 and 6. At block 712, the host program assigns a constant N as the upper limit of the Partition Map 415. The Partition IDs 611 of the partitions in the Partition Map 415 thus have a value between 0 and N−1, inclusively. The value of N might be dynamically assigned or modified to accommodate a dynamically sized Partition Map 415. At block 713, the host program assigns constants to a Lease Interval and a Fence Interval. A Lease interval is a predetermined period of time during which the participation of an application instance in the membership group remains valid. A Fence Interval is a multiple of the Lease Interval. In the exemplary embodiments of the invention, the Lease Interval is an integer in seconds.

The host program next initializes the Membership Table 414 at block 714 by pre-loading the table 414 with one row that has a Member ID 511 of "Nobody". The Partition Map 415 is also initialized with N rows that have the Owing Member IDs 612 as "Nobody", at block 715. The Partition IDs 611 for these rows are 0 to N−1 and their Lease Time-stamps 613 are set to minus infinity. The States 614 of the partitions are initialized to "unallocated". The system program initialization ends at block 716.

Figure 8:
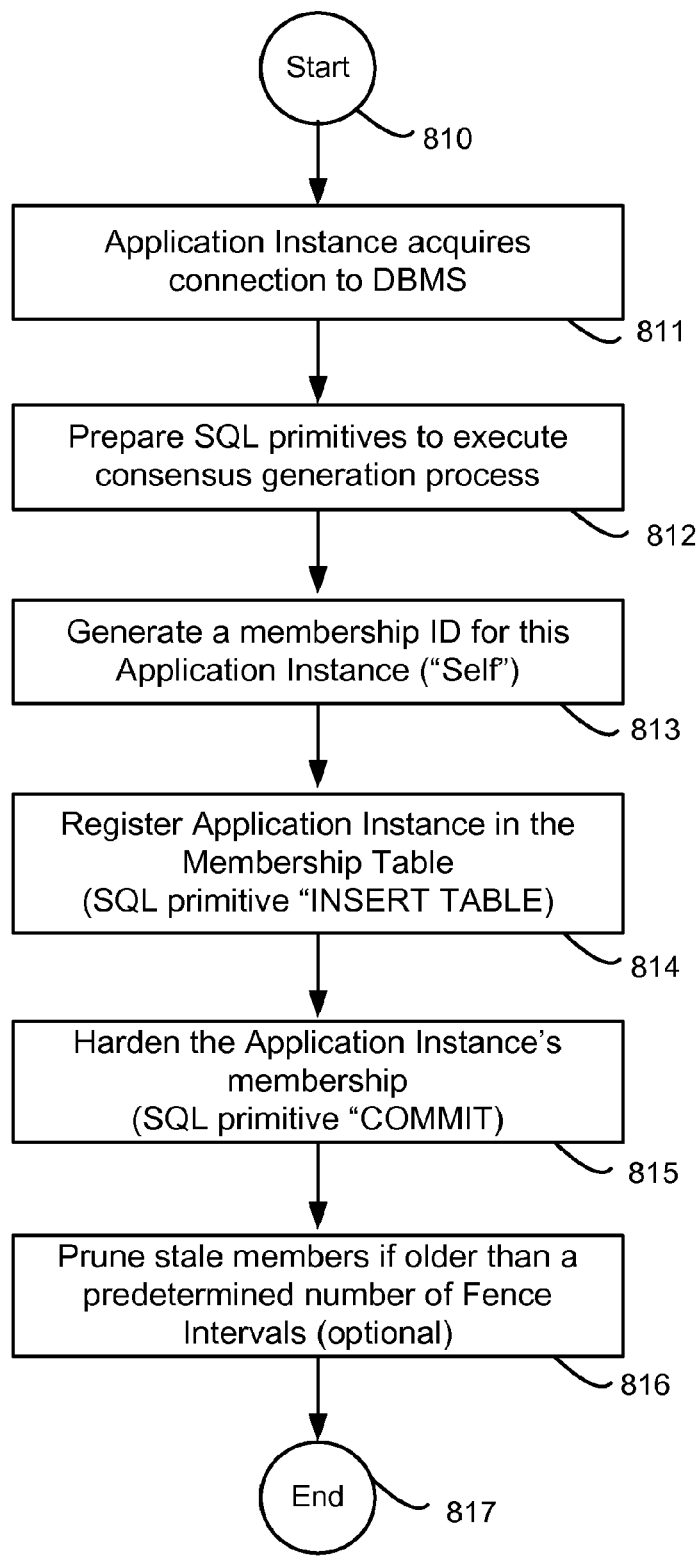
FIG. 8 is a flow chart representing an exemplary process for initializing an application server instance to provide distributed task-dispatch based on consensus among the application instances, in accordance with the invention.

FIG. 8 is a flow chart representing an exemplary process for initializing an application server instance to provide distributed task dispatch based on consensus according to the invention. All of the application server instances in the system need to be initialized in order to participate in the consensus-based allocation of the task partitions. The initialization process starts at block 810. At block 811, the application server instance acquires a connection to the DBMS. In the embodiments of the invention, the application instance consensus is generated using a set of SQL database primitives. Accordingly, at block 812, the application server instance prepares the relevant SQL primitives that would be used during system initialization, application instance initialization and the consensus generation process. Table 1 shows an exemplary set of SQL primitives and their functions that are relevant to the embodiments of the invention.

TABLE 1

| SQL Primitive | Functions |
| --- | --- |
| CREATE DATABASE | Create a database |
| CREATE TABLE | Create a relation table within a database |
| SELECT ALL ROWS | Select and read all or a predicated set of rows from a table |
| UPDATE | Update one or more rows in a table |
| SELECT FOR UPDATE | Select one or more rows from a table with intent to modify the rows |
| INSERT TABLE | Insert a new row into a table |
| DELETE TABLE | Delete one or more predicated rows from a table |
| COMMIT | Commit or harden all changes made to a database at this point in time. |

At block 813, the application instance creates its identity in the membership group by adding a row to the Membership Table 414 with a Member ID 511 of "Self" and other relevant values associated with its participation in the membership group, as described above for FIG. 5. The application instance registers itself in the Membership Table 414 maintained by the DBMS, at block 814, preferably using SQL primitive INSERT TABLE. The application instance next hardens its membership participation in the Membership Table 414 at block 815, preferably with the SQL primitive COMMIT. The application instance may prune stale members from the Membership Table 414 if their Birth Time-stamps 512 are older than a predetermined number of the Fence Intervals, at block 816. The pruning is optional and for eliminating old and unused rows in the Membership Table 414 that are no longer needed, e.g., those associated with the incarnations of some member instances in the system that have become invalid. The pruning operation is preferably made with the SQL primitive DELETE TABLE. In the embodiments of the invention, every reincarnation of an application instance in the membership group is assigned a new Member ID 511, which is a random string from a random generator of extremely low collusion properties. The initialization of each application instance ends at block 817.

Figure 9:
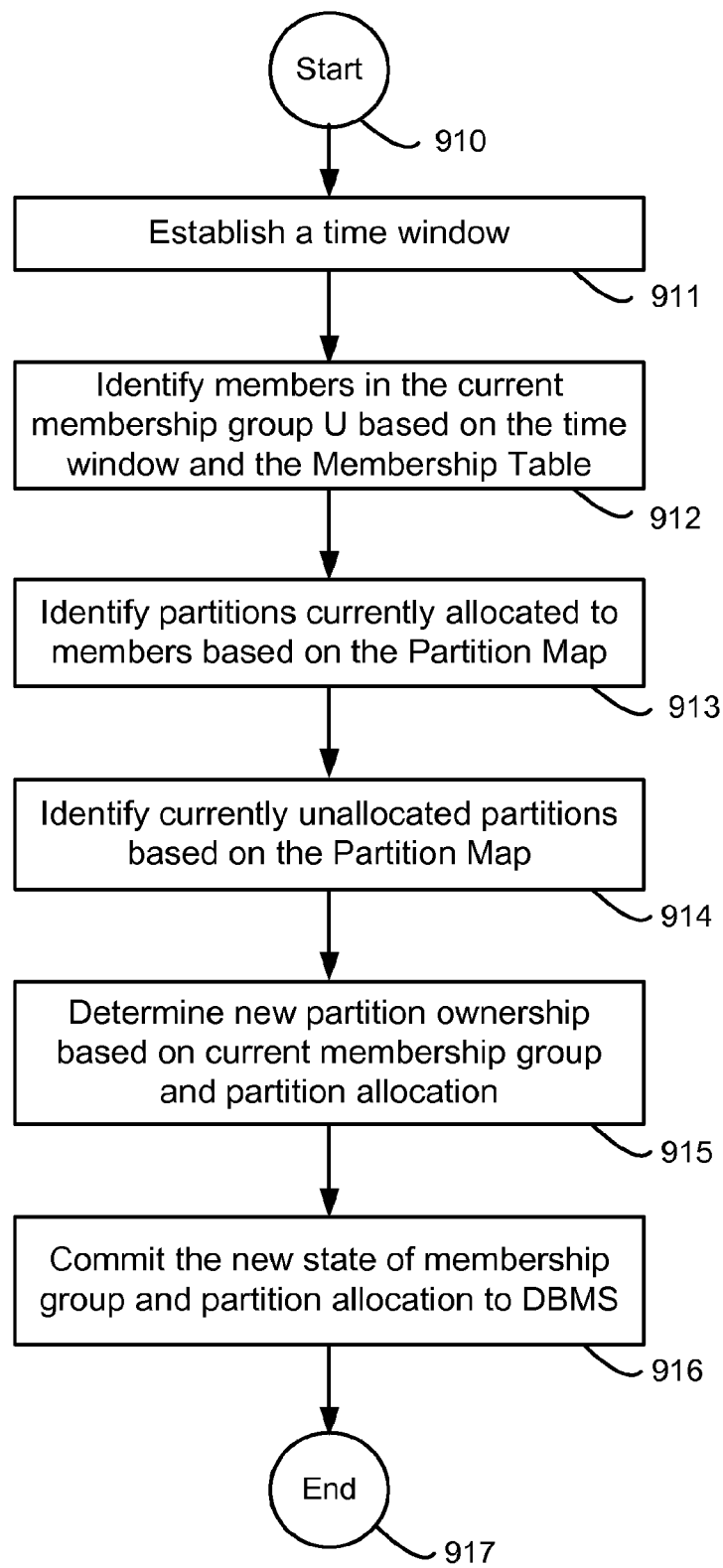
FIG. 9 is a high-level flow chart representing an exemplary process by each application server instance to provide distributed task-dispatch based on consensus among the application instances, in accordance with the invention.

FIG. 9 is a flow chart representing an exemplary high-level process performed by each application server instance in the embodiments of the invention. The process begins at block 910. At block 911, the application instance establishes a time window to be used for determining the current allocation of the task partitions in the membership group. Preferably, the time window begins at "Now" minus one Fence Interval and ends at "Now" plus one Lease Interval, where "Now" represents the present point in real time. At block 912, the application instance identifies the member instances that are currently in the membership group, designated as U, based on the time window and contents of the Membership Table 414.

The application instance further determines the partitions currently allocated to the member instances in the group based on contents of the Partition Map 415, at block 913, and the partitions that are not yet allocated to any member, at block 914. Using data on the current membership group and partition allocation, the application instance performs a load-balancing process to determine a new partition allocation for itself to reach a consensus with the other member instances, at block 915. Further details on the load-balancing process are described below in reference to FIGS. 10-13. The application instance then commits the newly derived state of the membership group and partition allocation to the DBMS 413 at block 916. The commit operation by the application instance is described below in reference to FIG. 14. The operation process of each application server instance ends at block 917.

Figure 10:
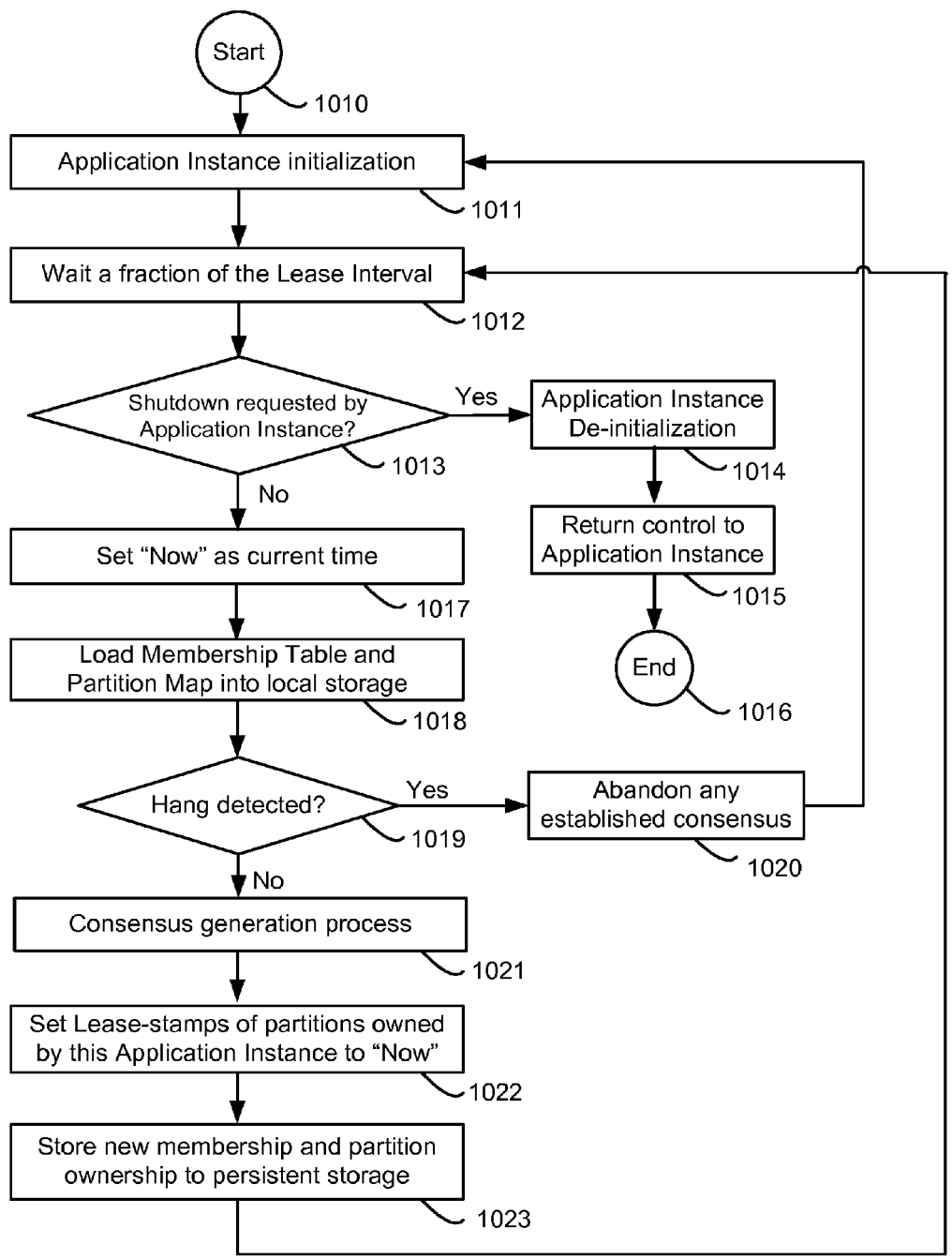
FIG. 10 is a flow chart representing further details of an exemplary process by each application server instance in determining membership group and partition allocation data to achieve consensus for distributed task-dispatch, in accordance with the invention.

FIG. 10 illustrates a flow chart representing a more detailed and exemplary process performed by each application server instance in the preferred embodiments of the invention. The process starts at block 1010. At block 1011, the application instance is initialized before the main loop of operation begins, preferably as described above in reference to FIG. 8. The application instance waits a fraction of the Lease Interval at block 1012. At block 1013, the application instance determines whether there is any pending system request to shut down the application. If so, it performs a de-initialization at block 1014 which includes removing itself from the Membership Table 414 and freeing all temporary storage and program variables. The control of the process is returned to the application instance at block 1015, and the process terminates at block 1016.

If no process hang is detected at block 1013, then the application instance sets the variable "Now" as the current time, at block 1017. It loads the Membership Table 414 and the Partition Map 415 from the DBMS 413 into its local storage at block 1018, preferably using the SQL primitive SELECT. A check for program hangs is made at block 1019. If there is a hang, then the application instance abandons any consensus state reached so far at block 1020 and restarts the process at the application instance initialization (block 1011). Otherwise, the application instance continues with a consensus generation at block 1021. Further details on the consensus generation process are described below in reference to FIGS. 11-13.

Once the consensus generation is completed, the application instance renews the leases on the partitions that it owns by setting their Lease Time-stamps to "Now", at block 1022. It also renews the lease on its participation in the membership group by setting the Lease Time-stamp corresponding to its participation in the Membership Table 414 to "Now". The application instance further stores the newly determined membership group and partition ownership data into the DBMS' persistent storage at block 1023 and returns to the wait operation at block 1012. The storing operation makes the state of the current group visible to all member instances in the present consensus. These are the application instances that have a connection to the DBMS and are participants in the consensus by virtue of executing the process just described.

Figure 11:
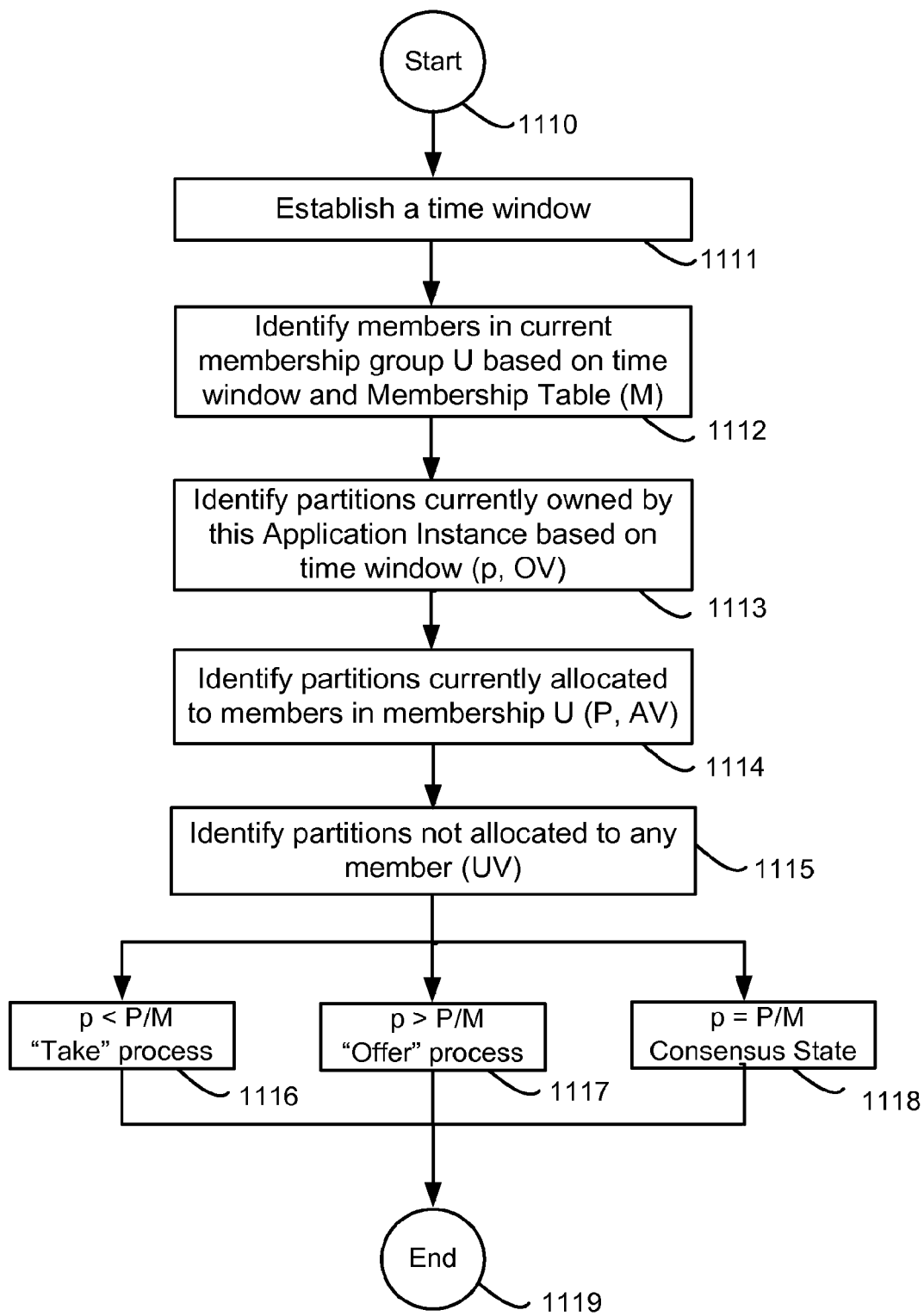
FIG. 11 is a flow chart representing an exemplary embodiment of a load-balancing process for achieving consensus for distributed task dispatch, in accordance with the invention.

FIG. 11 is a flow chart showing further details of the consensus generation performed by each application instance in the exemplary embodiments of the invention. It is important to note that each application instance processes and updates a copy of the Membership Table 414 and Partition Map 415 in its local storage during the consensus generation process, rather than the Membership Table 414 and Partition Map 415 maintained by the DBMS 413. The consensus generation process starts at block 1110. At block 1111, the application instance establishes a time window to be used in determining the membership group and partition ownership information. The time window preferably begins at "Now" minus one Fence Interval and ends at "Now" plus one Lease Interval, where the Fence Interval is a multiple of the Lease Interval. At block 1112, the application instance identifies the member instances in the current membership group (U) using the Membership Table 414 data and the time window. The member instances are those that have the their Lease Time-stamps within the time window.

At block 1113, the application instance identifies the partitions in the Partition Map 415 that it currently owns. As an example, the number of the partitions owned by this application instance is designated as "p" while the information on these partitions is stored in a local vector "OV" of the application. The application instance also identifies the partitions in the Partition Map 414 that are currently allocated to all members, including itself, in the membership group (at block 114) and those that are not currently allocated to any member (at block 1115). The total number of allocated partitions is designated as "P" as an example. The information relating to the allocated partitions and unallocated partitions, such as their Owning Member IDs and time-stamps, is respectively stored in the vectors OV and UV in the local storage of the application.

The application instance next performs a load-balancing operation at blocks 1116 through 1118 to achieve a consensus among the instances in the membership group. If the number of partitions owned by the instance is less than the average number of partitions owned by all members in the group, i.e., p<P/M, then the application instance would attempt to take one additional partition from those currently unallocated, at block 1116. If the number of partitions owned by the instance is greater than the average, i.e., p>P/M, then the instance would attempt to offer one of its partitions back to other members, at block 1117. Otherwise, a consensus among all the participating member application instances has been achieved and the instance does not need to make any adjustment on the partition allocation, at block 1118.

Further details on the "offer" and "take" operations are described below in reference to FIGS. 12 and 13. The load-balancing process terminates at block 1119. Other load-balancing techniques may also be used instead of the one just described. For example, the best fit of partition allocation to each member in the membership group may be computed based on specific membership capability. Other alternatives include standard bin-packing techniques that include constraint parameters as necessary for a particular situation. In other embodiments, the load-balancing may be achieved by arriving at a consensus associated with a vote or a quorum associated with the members in the membership group.

Figure 12:
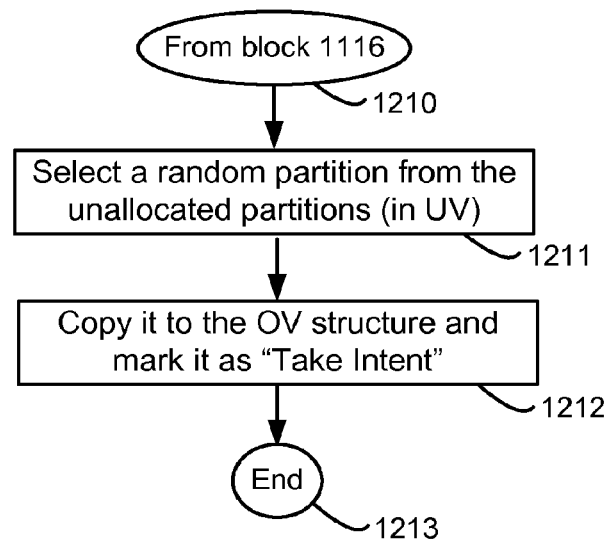
FIG. 12 is a flow chart representing an exemplary process for taking a partition from the group of unallocated partitions by an application instance, which continues from FIG. 11.

FIG. 12 is a flow chart representing an exemplary "take" process, which continues from block 1116 in FIG. 11, according to the embodiments of the invention. At block 1211, the application instance selects a random partition from those currently unallocated (i.e., from the local vector UV). The application instance then copies information relating to this partition into its OV vector, which is a local structure containing information on the partitions that it currently owns, at block 1212. The application instance further marks the state of this partition as being taken in its OV vector, e.g., "Take Intent". The "take" process for a partition ends at block 1213.

Figure 13:
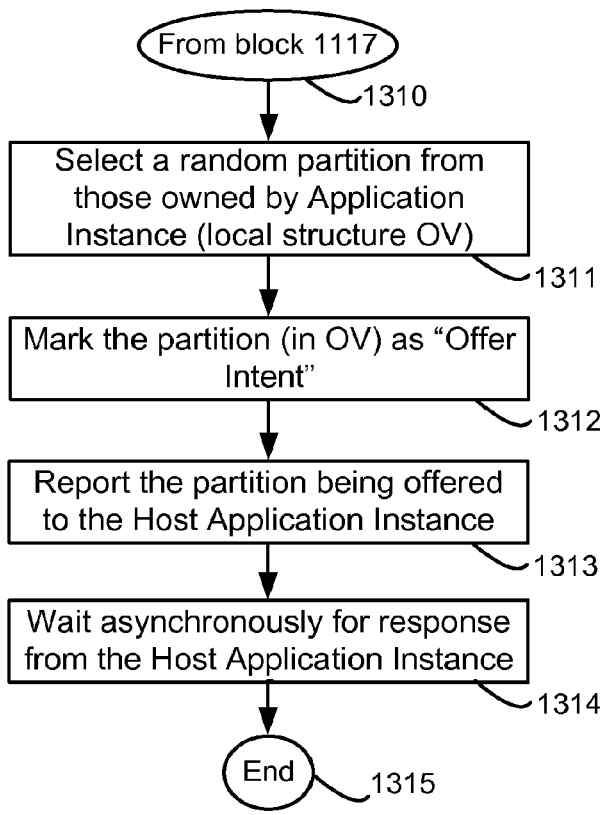
FIG. 13 is a flow chart representing an exemplary process for releasing a partition from those currently owned by a member application instance to the membership group, which continues from FIG. 11.

FIG. 13 is a flow chart representing an exemplary "offer" process, which continues from block 1117 in FIG. 11, according to the embodiments of the invention. At block 1311, the application instance selects a random partition from those it currently owns (from its local vector OV). The instance then marks the state of this partition as being released in its OV vector at block 1312, e.g., "Offer Intent". At block 1313, the application instance reports to the host application that the partition is being offered to the membership group. The instance then waits asynchronously for an acknowledgment from the host application, at block 1314. The "offer" process for a partition ends at block 1315.

Figure 14:
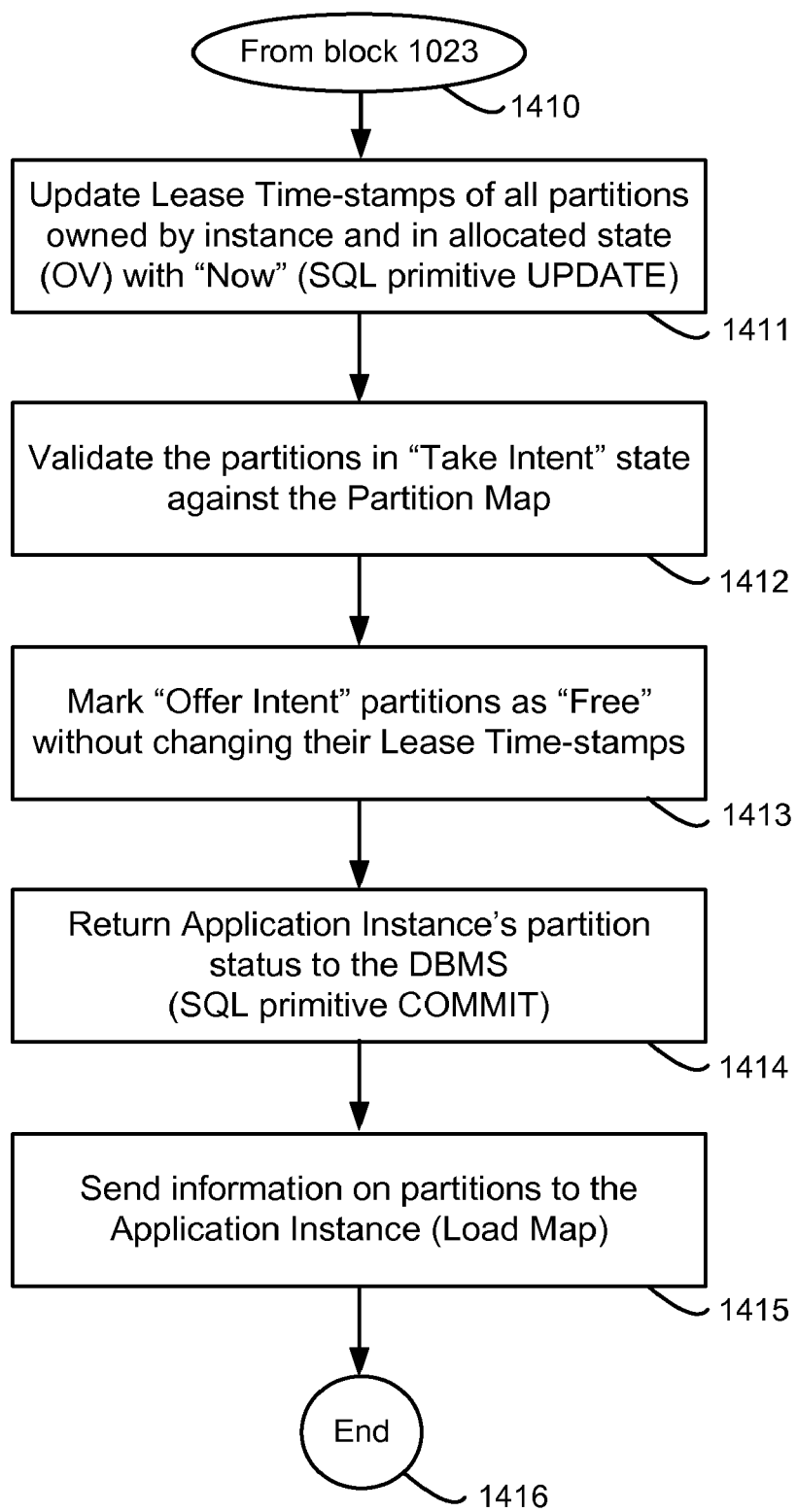
FIG. 14 is a flow chart representing an exemplary process for committing the new membership group and partition ownership information to persistent storage, in accordance with the invention.

FIG. 14 is a flow chart showing an exemplary process for storing the newly determined membership group and partition ownership information into the system's persistent storage in the embodiments of the invention. The process begins at block 1410. At block 1411, the application instance updates the Lease Time-stamps of the partitions that it owns with "Now", preferably using the SQL primitive UPDATE. The application instance next validates the partitions that it has designated as "Take Intent" in its local vector OV against the DBMS' Partition Map 415, at block 1412. The validation might be achieved by comparing the entries in the OV vector with the values in the Partition Map 415 using the SQL primitive SELECT FOR UPDATE. This operation assures that the version of the partition allocation in the local copy of the application instance is the same as that in the DBMS 413 and that the allocation is now held in locked state exclusively by this member instance until the point of commit or hardening.

The application instance further changes the status of the "Offer Intent" partitions in its OV vector to "Free", optionally with or without changing their Lease Time-stamps, at block 1413. It then returns the determined partition ownership status to the DBMS 413 at block 1414, preferably with the SQL primitive COMMIT. At block 1415, the application instance sends the partition ownership information that it has determined to the host application, which uses the information in its interaction with the DBMS 413 and the external application 411. The process for storing the membership group and partition ownership information into persistent storage ends at block 1416.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method for distributing tasks to a plurality of application server instances in a membership group, the method comprising:
   identifying, by each application server instance in the membership group, a number of task partitions owned by the each application server instance based on a predetermined time window;
   performing load balancing operation based on consensus among the plurality of application server instances in the membership group by comparing the number of task partitions owned by the each application server instance with an average of number of task partitions owned by the plurality of application server instances in the membership group; and
   generating a new membership group and a new partition ownership according to a result of the load balancing operation, wherein the new membership group includes those application server instances having lease time-stamps within the predetermined time window.

2. The method of claim 1, wherein each membership participation by an application server instance is identified by a random number in a membership table of each application server instance participating in the membership group and a partition map of task partitions each corresponding to a set of tasks.

3. The method of claim 1, wherein the identifying is an identifying a current partition ownership which includes task partitions owned by an application server instance, task partitions allocated to other application server instances in the membership group, and task partitions that are unallocated.

4. The method of claim 1, wherein the performing the load balancing operation comprises:
   determining an average number of task partitions based on the total number of partition ownership and the number of the application server instances in the membership group;
   releasing a task partition owned by an application server instance if the number of task partitions owned by the application server instance is more than the average number of task partitions; and
   taking a task partition from those currently unallocated if the number of task partitions owned by the application server instance is less than the average number of task partitions.

5. The method of claim 4, wherein the releasing comprises:
   selecting a random partition currently owned by the application server instance;
   reporting the selected partition to a host application as being released; and
   waiting for an acknowledgment from the host application.

6. The method of claim 5, further comprising marking the selected partition as unallocated to the membership group in a local copy of the partition map.

7. The method of claim 4, wherein the taking comprises:
   selecting and allocating a random partition from those currently unallocated; and
   marking it as allocated in a local copy of the partition map.

8. The method of claim 1, wherein the predetermined time window begins at a present time minus a multiple of a lease interval and ends at the present time plus the lease interval.

9. The method of claim 1, further comprising resetting the lease time-stamps of the application server instances in the new membership group to a present time.

10. The method of claim 1, further comprising removing from the new membership group any application server instance having expired lease time-stamp.

11. The method of claim 1, wherein the application server instances create and update data in a Database Management System (DBMS) using SQL primitives.

12. The method of claim 1, wherein the method further comprises:
   rebalancing, by each of the application server instance, the task partitions owned by each of the application server instance based on the identifying a current partition ownership.

13. The method of claim 1, further comprising:
   recording the new membership group and the new partition ownership in a membership table of each application server instance participating in the membership group and a partition map of task partitions each corresponding to a set of tasks, respectively.

14. The method of claim 1, wherein the plurality of application server instances communicate with a Database Management System (DBMS) having a membership table of each application server instance participating in the membership group and a partition map of task partitions each corresponding to a set of tasks.

15. The method of claim 1, wherein the load balancing operation is performed by each application server instance in the membership group.

* * * * *